United States Patent [19]

Bihlmaier

[11] Patent Number: 4,836,559
[45] Date of Patent: Jun. 6, 1989

[54] SEAL ASSEMBLY WITH MELTABLE METAL BINDER LAYER

[75] Inventor: John A. Bihlmaier, Marengo, Ill.

[73] Assignee: Sundstrand Corporation, Rockford, Ill.

[21] Appl. No.: 139,656

[22] Filed: Dec. 30, 1987

[51] Int. Cl.⁴ .............................................. F16J 15/28
[52] U.S. Cl. ......................................... 277/26; 277/1; 277/235 A; 277/236
[58] Field of Search .................... 277/1, 22, 26, 235 R, 277/235 A, 236

[56] References Cited

U.S. PATENT DOCUMENTS

| | | | |
|---|---|---|---|
| 3,188,100 | 6/1965 | Delgado | 277/235 A X |
| 3,904,405 | 9/1975 | Russell et al. | 75/201 |
| 3,939,903 | 2/1976 | Sakaki et al. | 165/9 |

FOREIGN PATENT DOCUMENTS

| | | | |
|---|---|---|---|
| 3122904 | 1/1983 | Fed. Rep. of Germany | 277/235 B |
| 2502287 | 9/1982 | France | 277/26 |
| 914937 | 1/1963 | United Kingdom | 277/235 R |
| 1375647 | 11/1974 | United Kingdom | 277/26 |
| 1379434 | 1/1975 | United Kingdom | 277/26 |

*Primary Examiner*—Robert S. Ward
*Attorney, Agent, or Firm*—Wood, Dalton, Phillips Mason & Rowe

[57] ABSTRACT

A seal assembly for such applications as a dynamic machine having a rotary component which is mounted for rotation in a housing having an interior wall. A seal member is provided with an inner sealing surface and an outer surface. A coating of metal is electroplated to the outer surface of the seal member. A meltable metal binder layer is bonded between the metal coating and the interior wall of the housing to create, effectively, a metal-to-metal bond between the seal member and the housing.

25 Claims, 1 Drawing Sheet

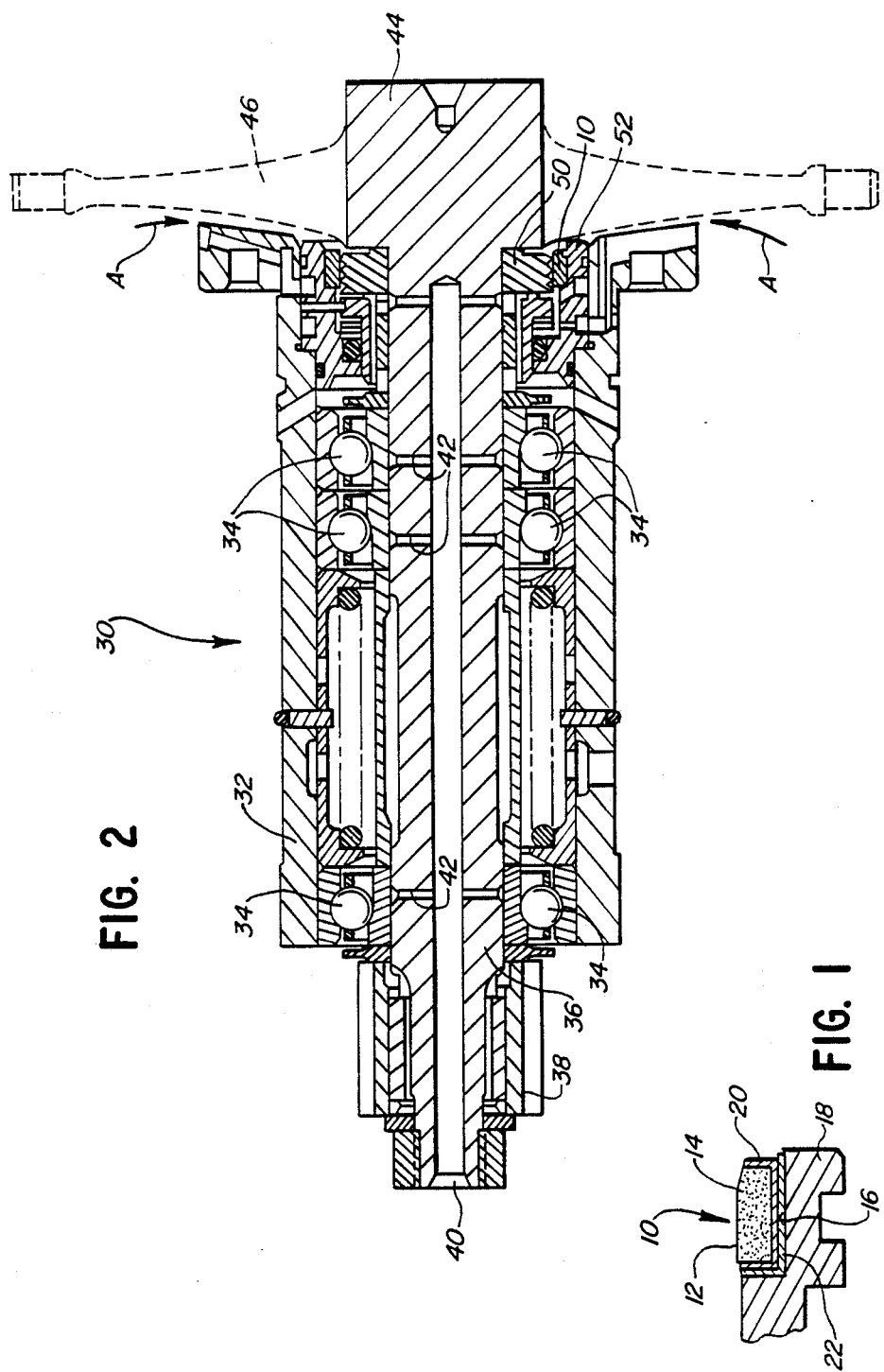
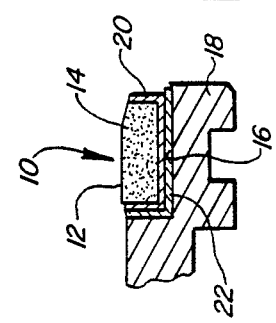
FIG. 2
FIG. 1

SEAL ASSEMBLY WITH MELTABLE METAL BINDER LAYER

FIELD OF THE INVENTION

This invention generally relates to seal assemblies and, particularly, to a seal assembly for a rotary component or the like which includes a seal member which is not readily bondable to non-compatible structures.

BACKGROUND OF THE INVENTION

Pump seals, turbine seals, shaft seals and other similar seal applications may find it necessary to use a seal component which has very high heat generative properties. For instance, carbon seals often are used in dynamic machines which have rotary components. Such materials as carbon are somewhat brittle and produce very high heat under friction conditions. Consequently, such carbon seals have been limited to low speed uses because of heat transmission problems. There has been difficulty in transmitting heat away from carbon seals by known assembly procedures.

Carbon seals, rings and the like heretofore have been held in place by adhesives or, in some cases, mechanically by clamping, shrink fitting or retained with the use of grooves, snap rings, splines, etc. Adhesives and mechanically held mechanisms create problems due to the inherent characteristics of carbon or carbon/graphite material.

Such seals are brittle, fragile and transmit frictional heat. They are desirable because of their very low coefficient of thermal expansion, but they have a very high thermal conductivity. When a carbon seal is used in conjunction with a high speed rotating component, for instance, the seal generally is fastened to a stationary component or housing at a particular position relative to the rotating component. Typically, the housing is made of metal and the carbon seal is attached to the metal housing. Since the carbon seal is an excellent conductor of heat, the heat which is generated at the sealing surface propagates quickly through the seal to the surface that is attached to the stationary housing.

If the carbon seal is bonded to the housing with a substance that is heat sensitive, as with most adhesives, the heat traveling from the source proximate the rotating shaft toward the stationary housing can adversely affect the bonding characteristics of the adhesive. Although most adhesives are desirable for withstanding harsh environments, they also act as insulators and will not allow the heat to dissipate. As a result, the frictional heat builds up until the sheer strength of the adhesive breaks down, allowing the carbon seal to rotate and destroy itself.

Grooves, splines or other geometric, mechanical fastening systems often cause cracks in the seal due to the brittle nature of the material, such as carbon.

With shrink fit systems, if the carbon part is held too tight, strain is created and the carbon material will easily break. The tolerance problems of shrink fit systems are impractical in most applications. If the shrink fit is at a minimum, when the heat reaches the surrounding housing, the housing will expand due to its coefficient of thermal expansion, resulting in a loosening of the seal itself. Maintaining tight tolerances simply is impractical and far too costly with most applications.

This invention is directed to solving the above problems and satisfying a need for a new and improved seal assembly and method of fabricating a seal which uses a high heat generative, usually brittle, material such as carbon or the like.

SUMMARY OF THE INVENTION

An object, therefore, of the invention is to provide a new and improved seal assembly of the character described.

In the exemplary embodiment of the invention, a seal assembly is provided for use in such applications as a dynamic machine having a rotary component which is mounted for rotation in a housing having an interior wall. Of course, any variety of seal applications, such as in pumps, turbines, rotating shafts and the like, are applicable areas in which the invention is quite useful. The seal assembly includes a seal member having an inner sealing surface and an outer surface. Generally, a coating of metal is electroplated to the outer surface of the seal member or another surface adjacent the structure to which the seal assembly is to be mounted. A meltable metal binder layer then is bonded between the metal coating and the interior wall of the housing or other structure to which the seal is mounted.

Generally, as disclosed herein, the seal member is formed of a brittle, high heat generative material. The electroplated coating is formed of a corrosion resistant metal of a relatively high melting point. The metal binder is formed of a low temperature melting material.

Specifically, the seal member may be formed of carbon or carbon/graphite material, the electroplated coating may be formed of nickel, and the binder may be formed of a tin/gold alloy. The nickel is readily electroplatable, has a relatively high melting point and is very resistant to corrosive atmospheres. The tin/gold binder provides a low melting point due to the tin component, and the gold is added to resist corrosion.

The metallic bonding technique of the invention provides an excellent heat transfer characteristic by which heat can be transferred from the carbon seal member to the housing. Since the housing is a much better heat sink than the seal member, this is advantageous. In addition, the housing can be water cooled, for instance, and this can further improve the ability of the housing to sink large quantities of heat.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a fragmented section through a seal assembly embodying the concepts of the invention; and FIG. 2 is an axial section through a turbine balance assembly with which the seal assembly is incorporated.

DETAILED DESCRIPTION OF THE PREFERRED EMBODIMENT

Referring to the drawings in greater detail, and first to FIG. 1, the invention contemplates a seal assembly, generally designated 10, and a method of making the assembly, for use in a wide variety of applications, such as a pump seal, a turbine seal, a shaft seal and other seal applications, usually where high speed movement is involved as in a rotary dynamic machine. The seal assembly engages a moving component, such as a high speed rotating component, by engagement with a surface 12 of a seal member 14. As shown, seal member 14 is illustrated in section as part of a seal ring within a cutout surface 16 of a surrounding housing 18 which in this case is water cooled. Of course, housing 18 may be any structure to which the seal assembly is to be mounted as by the bonding concepts of this invention so long as it has heat dissipating means.

The invention is directed to such seal members 14 as those which have high heat dissipating properties, such as carbon, carbon/graphite or the like. As stated above, the use of such seal members create various problems, including the very brittle nature of the material and the fact that such materials are not readily bondable by molten metal.

The invention contemplates applying a coating 20 to the outside surface of seal 14 in such a manner that the coating adheres to the seal material and "prepares" the seal surface for bonding to housing 18 by a binder material, such as a low melting metal binder layer 22. It is contemplated that a metal, such as nickel, form the substance of coating layer 20, and the metal coating is adhered to seal 14 by electroplating processing. Simply applying a meltable metal to the surface of the seal would not be sufficient, because the molten metal will not stick to the material of the seal, such as carbon. However, the metal coating can be adhered to the carbon material by electroplating. Other metals than nickel, such as copper, can be electroplated to seal 14. Nickel has been selected because of its resistance to high corrosive atmospheres, such as liquids in exhaust by-products of a turbine as described hereinafter. In essence, the electroplated coating 20 "prepares" the surface of the seal material for bonding to housing 18.

Binder layer 22 is of a meltable or flowable metal which forms a bond between metal coating 20 and metal housing 18. In other words, a metal-to-metal bond is capable of being formed by the invention notwithstanding the incompatibility of the carbon material of seal 24 to such a bond directly. In the preferred embodiment of the invention, the metal material of binder layer 22 has been selected to be a tin/gold solderable alloy material, such as 20% tin and 80% gold. This alloy has substantially the same melting temperature as pure tin or lead tin, i.e. the material starts to melt at approximately 600° F. Pure tin is not used in hostile atmospheres because of its corrosion propensities. Therefore, the gold is added to rewsist corrosion in atmospheres, such as the exhaust gases of turbines. The exhaust gases actually may get higher than 600° F., but the alloy is such a gold conductor that the material does not begin to melt. The alloy is of a relatively low melting temperature as compared to that of the nickel coating 20.

The method of this invention contemplates electroplating seal part 14, such as of carbon or carbon/graphite with the nickel material. The nickel-plated carbon and the mating area of the surrounding structure, such as housing 18, then is tinned with the low melting metal, i.e. the tin/gold alloy. The parts are allowed to cool to near ambient temperature. The nickel-plated carbon then is placed on the housing and heat is directed to the tinned nickel-plated carbon ring. The low melting binder material melts and the ring will slip into the tinned mating area of the housing thereby seating the seal into the housing. Heat then is removed and the assembly is allowed to cool. Final machining is performed on the seal area, and a bond interface of high integrity thusly has been formed. The metal-to-metal bond has high heat dissipation as metal binder layer 22 acts as a heat sink with excellent heat dissipation. Electroplating the carbon seal with nickel provides a strong base with excellent properties for such applications as described hereinafter, but other metals may be advantageous under other applications. The same holds true for the specific content of the metal binder, which has been described herein as a tin/gold alloy.

FIG. 2 illustrates but one application of the invention in a turbine balance assembly, generally designated 30. The assembly includes a bearing housing 32 for housing bearings 34 which rotatably support a rotating shaft 36. The shaft has a pinion gear 38 as part of an appropriate gear train back to a motive means (not shown) for rotating the shaft. A lube oil inlet 40 also is provided axially through the shaft, with radial outlets 42 for lubricating the assembly. The shaft has a front hub portion 44 for mounting a turbine wheel 46. A seal assembly 10 surrounds a mating ring 50 fixed to hub 44 for rotation therewith. The seal assembly 10 is in accordance with the invention and is positioned in a seal housing 52, as shown in FIG. 1, for sealing engagement with mating ring 50. In such applications, highly caustic, high temperature exhaust gases can seep behind turbine wheel 46, such as in the direction of arrows "A", to seal assembly 10. Therefore, in this particular application, it can be understood why the particular materials described above have been selected for such a high speed, hostile atmosphere. Of course, the invention is not limited to such an application.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a dynamic machine having a rotary component or the like which is mounted for rotation in a housing having an interior wall, a seal assembly comprising:

a seal member having an inner sealing surface and an outer surface;

a coating of metal electroplated to the outer surface of the seal member; and a meltable metal binder layer bonded between the metal coating and the interior wall of the housing.

2. The seal assembly of claim 1 wherein said seal member is formed of a brittle, high heat generative material.

3. The seal assembly of claim 2 wherein said seal member comprises carbon material.

4. The seal assembly of claim 1 wherein said coating is formed of corrosion resistant metal.

5. The seal assembly of claim 4 wherein said coating comprises nickel.

6. The seal assembly of claim 1 wherein said binder layer is formed of a low temperature melting metal material.

7. The seal assembly of claim 6 wherein said binder layer comprises a tin/gold alloy.

8. The seal assembly of claim 1 wherein said coating comprises a metal material having a relatively high melting point and said binder layer comprises a metal material having a relatively low melting point.

9. In a dynamic machine having a rotary component or the like which is mounted for rotation in a housing having an interior wall, a seal assembly comprising:
   a generally brittle seal member of high heat generative material having an inner sealing surface and an outer surface;
   a corrosion resistant metal coating electroplated to the outer surface of the seal member; and
   a binder layer of a low temperature melting metal bonded between the metal coating and the interior wall of the housing.

10. The seal assembly of claim 9 wherein said seal member comprises carbon material.

11. The seal assembly of claim 9 wherein said coating comprises nickel.

12. The seal assembly of claim 9 wherein said binder layer comprises a tin/gold alloy.

13. The seal assembly of claim 9 wherein said coating comprises a metal material having a relatively high melting point and said binder layer comprises a metal material having a relatively low melting point.

14. In a dynamic machine having a rotary component or the like which is mounted for rotation in a housing having an interior wall, a seal assembly comprising:
   a seal member including carbon material, the seal member having an inner sealing surface and an outer surface;
   a coating of metal, including nickel, electroplated to the outer surface of the seal member; and
   a meltable metal binder layer of a tin/gold alloy bonded between the metal coating and the interior wall of the housing.

15. A seal assembly, comprising a seal member having a first sealing surface on one side thereof, a coating of metal electroplated on another side of the seal member, and a meltable metal binder layer bonded between the metal coating and a structure to which the seal assembly is to be mounted.

16. A method of fabricating a seal assembly, comprising the steps of:
   providing a seal member having a first sealing surface on one side thereof;
   electroplating a metal coating on another side of the seal member; and
   applying a meltable metal binder layer to the coating between the coating and a structure to which the seal assembly is to be mounted.

17. The method of claim 16 wherein said seal member is provided of a brittle, high heat generative material.

18. The method of claim 17 wherein said seal member is provided at least partially of carbon material.

19. The method of claim 16 wherein said coating is provided of a corrosion resistant metal.

20. The method of claim 19 wherein said coating is provided of nickel.

21. The method of claim 16 wherein said binder layer is provided of a low temperature melting metal material.

22. The method of claim 21 wherein said binder layer is provided of a tin/gold alloy.

23. The method of claim 16 wherein said coating is provided of a metal material having a relatively high melting point, said binder layer is provided of a metal material having a relatively low melting point.

24. The method of claim 23 wherein said coating material and said binder layer material are provided of corrosion resistant metal.

25. The method of claim 16 wherein said meltable metal binder layer is applied to both the metal coating and the structure to which the seal assembly is to be mounted and then heated to create a bond interface.

* * * * *